Patented Sept. 16, 1941

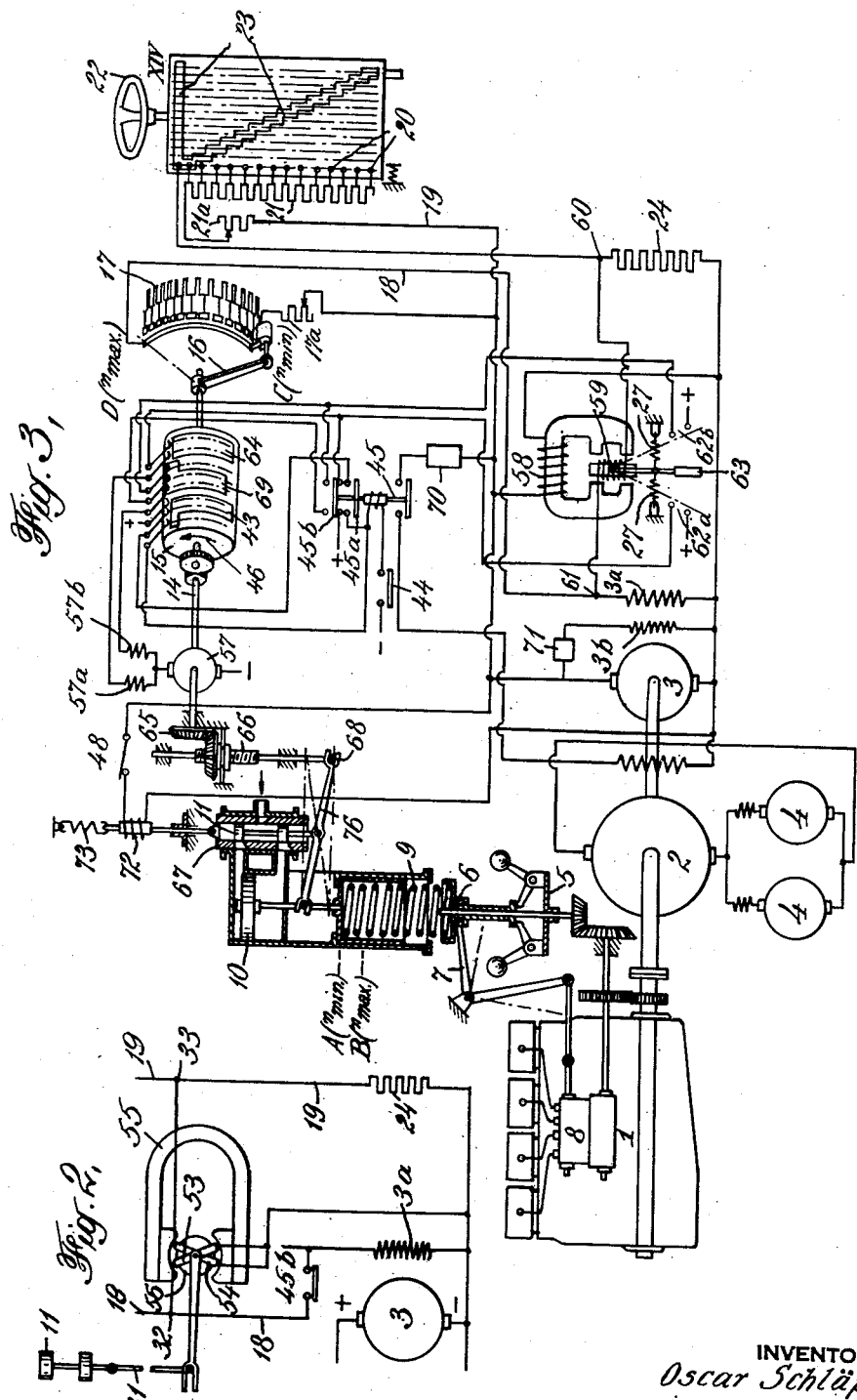

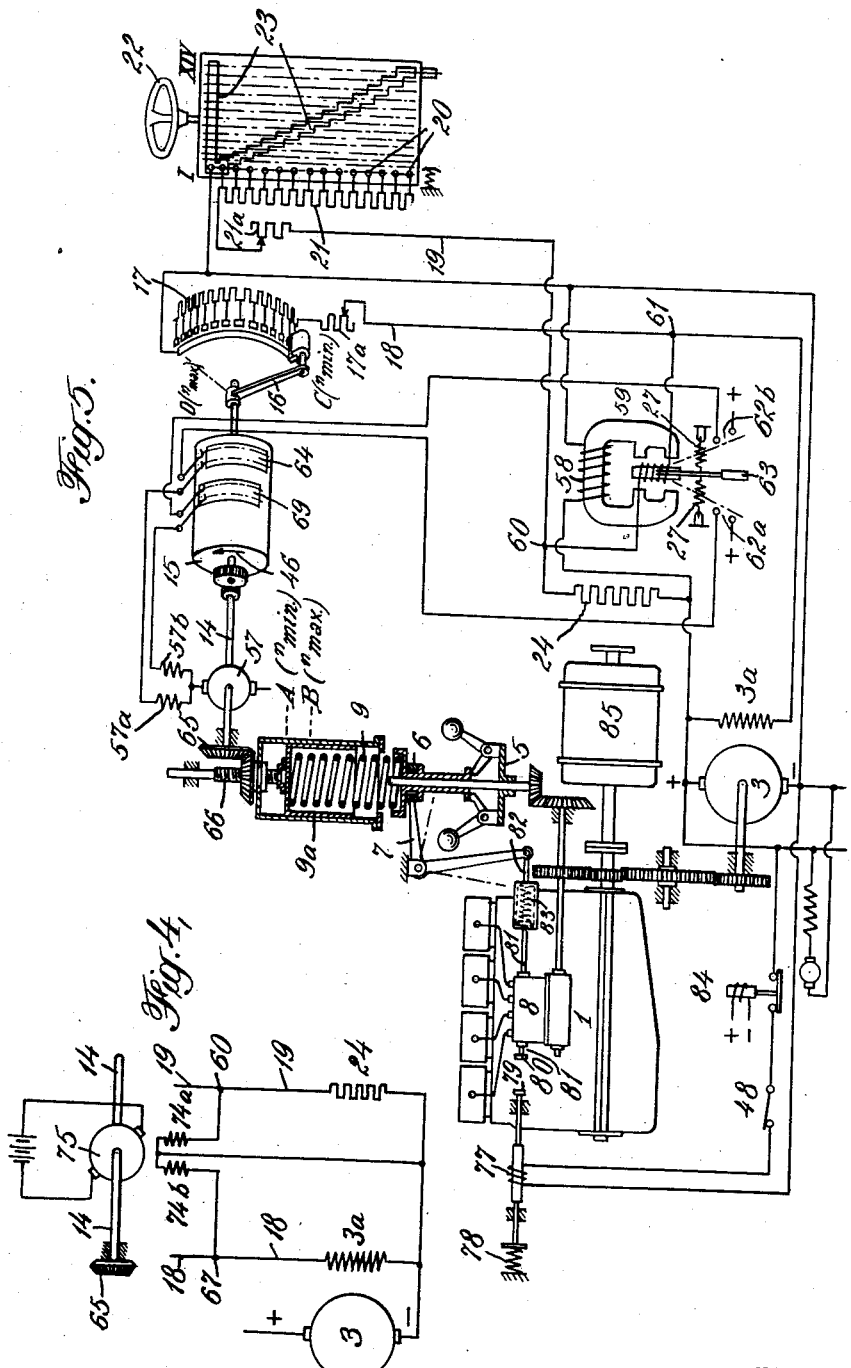

2,256,294

UNITED STATES PATENT OFFICE 2,256,294

POWER GENERATING APPARATUS

Oscar Schläpfer, Winterthur, Switzerland, assignor to Sulzer Frères, Société Anonyme, Winterthur, Switzerland Application January 15, 1940, Serial No. 313,870
In Switzerland January 25, 1939

20 Claims. (Cl. 290—40)

The invention relates to a prime mover, especially an internal combustion engine, which drives a generator operated with voltage maintained constant at least approximately, and which can be operated at different speeds by means of an adjustable device for altering the number of revolutions. It consists in that, parallel to a field circuit of the generator with a resistance serving to maintain the voltage constant, a control circuit with a control resistance is provided which has several tappings, an impulse transmitter being inserted between the control circuit and the field circuit and responding to alterations in voltage and influencing the adjusting of the number of revolutions, so that a voltage difference between certain points of the control circuit and of the field circuit caused by the alteration of the tapping of the control resistance effects the intended altering of the number of revolutions.

Several embodiments of the invention are diagrammatically illustrated in the accompanying drawings.

Fig. 2 shows a modification for the impulse transmitter according to the principle of an electric crossed-coil instrument.

Figure 1:
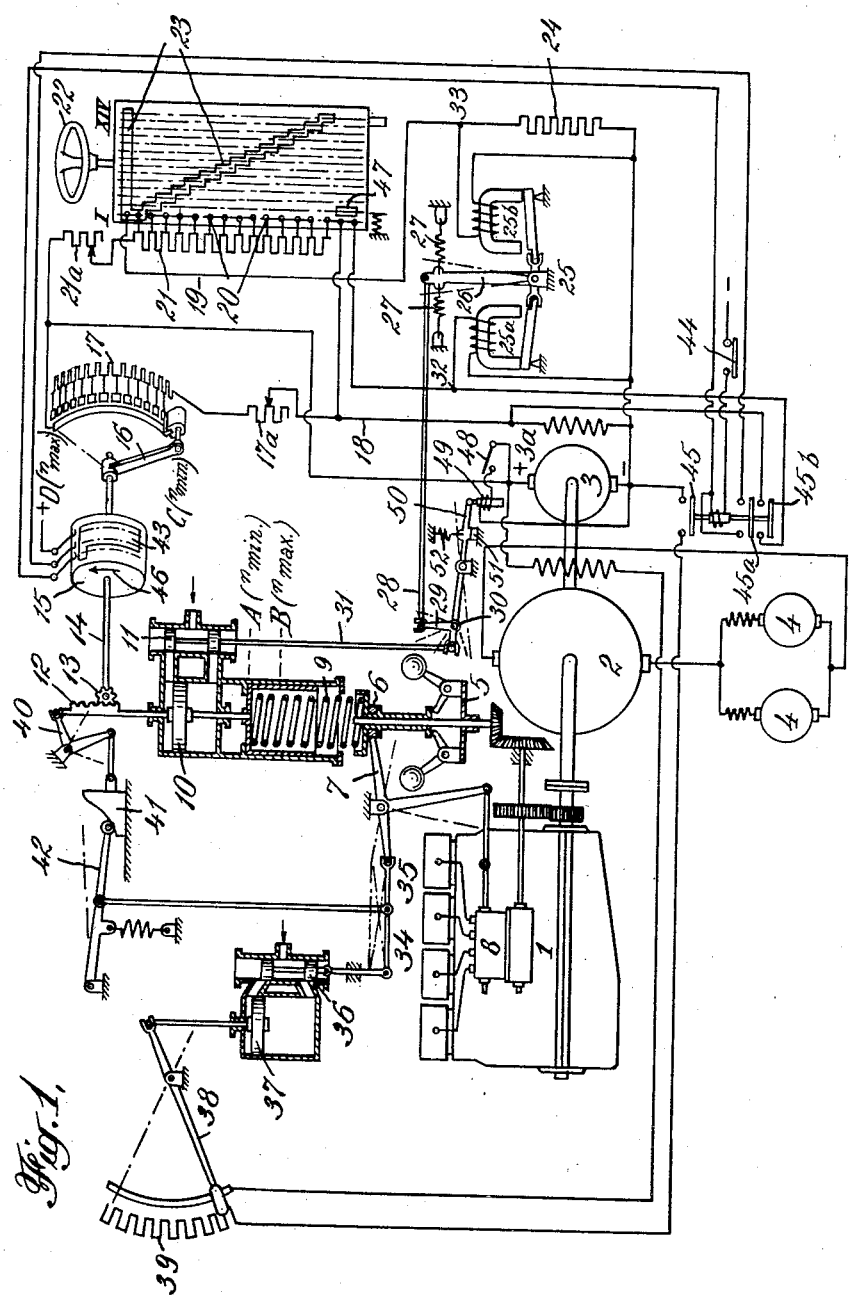
Fig. 1 illustrates an arrangement, in which an impulse transmitter connected with the auxiliary generator field and with a control resistance and constructed as double magnet controls an oil-operated servomotor for adjusting the governor springs.

Fig. 3 illustrates another arrangement, in which a polarised relay is employed as impulse transmitter and connected to tappings in the control circuit and in the field circuit of the auxiliary generator and causes a motor for adjusting the speed of rotation to revolve in the direction which results in an increase or decrease of the number of revolutions, according to whether the voltage difference is positive or negative.

Fig. 4 shows another arrangement of the motor for the speed adjusting device, and Fig. 5 shows further modifications for the tapping of the circuit of the polarised relay and for a servomotor for adjusting the number of revolutions.

The internal combustion engine 1 drives, as shown in Fig. 1, the main generator 2, which supplies current to two electric motors 4, and it drives also the auxiliary generator 3. The speed governor 5 of the engine 1 adjusts through the sleeve 6 and the lever 7 the effective delivery of the fuel pumps 8 of the engine 1.

The number of revolutions of the internal combustion engine 1 is altered by compressing, with the aid of the hydraulic servomotor, the spring 9 loading the fly weights of the governor 5, the piston 10 of the servomotor being controlled by a piston valve 11.

A toothed rack 12 connected with the servomotor piston 10 rotates a shaft 14 through the intermediary of a spur wheel 13. On this shaft 14 a drum 15 and a contact lever 16 of a regulating resistance 17 are fixed. The resistance 17 forms a part of a field circuit 18 comprising the field coil 3a of the generator 3. By means of the contact lever 16 the resistance 17 is adjusted so that the voltage of the auxiliary generator 3 remains constant at all speeds of the engine 1.

A controlling circuit 19 with a control resistance 21 having several tappings 20 is provided parallel to the field circuit 18 of the auxiliary generator 3 with the resistance 17. A controller 22 serves for altering the tapping and thereby for adjusting the internal combustion engine 1 to a predetermined speed, the contacts 23 of this controller cooperating with the tappings 20. A fixed resistance 24 is further provided, which is arranged in the control circuit 19 corresponding to the resistance of the field winding 3a in the field circuit 18. The resistances 17a and 21a in the two circuits serve for instance for being permanently adjusted for the equalisation of individual resistances or of the total resistance in the two circuits.

An impulse transmitter 25 with the two electromagnets 25a and 25b is inserted between the control circuit 19 and the field circuit 18, this impulse transmitter responding to alterations of voltage in these circuits, in that one magnet 25a is excited by a partial voltage in the field circuit 18 and the other by a partial voltage in the control circuit 19. The impulse transmitter 25 influences by means of a lever 26, returned into the mid-position by tension springs 27 when the two magnets 25a and 25b are equally excited, and by means of the system of rods 28 to 31, the position of the piston valve 11 and thereby the speed adjusting device or the position of the servomotor piston 10. The impulse transmitter 25 is inserted between the circuits 18 and 19 so that the voltage difference, for instance between the points 32 and 33, which occurs owing to alteration of the tapping of the control resistance 21 effects the intended alteration of the speed of the internal combustion engine 1 corresponding to the position of the controller relative to the tapping points 20.

At the maximum switching-in of the control resistance 21 the resistance value of this control resistance 21, increased by the value of the additional resistance 21a, is in proportion to the stationary resistance 24 equal to or greater than the regulating resistance 17 with the additional resistance 17a in proportion to the resistance of the field winding 3a, i. e.:

$$\frac{21+21a}{24}=\frac{17+17a}{3a}$$

With minimum switched-in control resistance 21, the following proportion results:

$$\frac{21a}{24}=\frac{17a}{3a}$$

Between the minimum and maximum settings of the controller 22 there is accordingly the relation:

$$\frac{21+21a}{24}=\frac{17+17a}{3a}$$

The control resistance 21 has preferably as many tappings as the regulating resistance 17.

The lever 7 adjusts through a double lever 34 with the adjustable pivot point 35 the control valve 36 and governs therefore the position of a servomotor piston 37, which in known manner regulates by means of the adjustable resistance 38, 39 the field of the main generator 2 so that the loading of the internal combustion engine 1 remains constant. The position of the pivot point 35 is influenced by means of the system of rods 40—42 in accordance with the setting of the speed adjusting device 10, 11, so that a certain torque is maintained constant in correspondence to each of the adjusted speeds.

A contact 43 of the drum 15 serves to interrupt the excitation of the main generator 2, in the position of the shaft 14 which corresponds to the lowest speed, by opening the control circuit for the relay 45. The relay 45 is on the other hand switched-in from this extreme position, when the switch 44 is closed, by means of the contact 43 by a slight rotation of the shaft 14 or of the drum 15 in the direction of the arrow 46, i. e. similar as when increasing the speed. When shaft 14 is rotated further, the relay 45 itself is held by a holding contact 45a. A contact 47 on the controller 22 serves to bridge-over the contact 45b of the exciter relay 45, so that the drum 15 can be brought into the above-mentioned position for switching-in the relay 45 as long as the relay 45 is still open.

If the relay 45 is cut out for any reason, either by the functioning of a maximum relay, for instance of the switch 44, or by a deadman's apparatus, it is preferable to return the speed adjusting device 10, 11 at once without having first to adjust the controller 22 into the position for the lowest speed of the engine 1. For this purpose the auxiliary contact 45b is used, which, when the relay 45 is in the cut-out position, interrupts the current supply to the magnet 25a, so that under the influence of the magnet 25b the lever 26 is pulled to the left and the piston valve 11 is pulled downwards, and the piston 10 of the servomotor is consequently brought into the extreme top position.

In the position A ($n_{min.}$) shown in the drawings the tension of the spring is a minimum. The internal combustion engine 1 runs then at the lowest speed and the regulating resistance 17 is cut out. The tapping on the controller 22 is quite at the top, the control resistance 21 being wholly cut out. Consequently, the resistances of the control and field circuits are in this position as $$\frac{21a}{24}=\frac{17a}{3a}$$

The two resistance branches are fed with current at the same voltage (the voltage of the auxiliary generator 3); the partial voltage at the terminals of the fixed resistance 24 is therefore equal to or greater than the partial voltage at the terminals of the field coil 3a. The lever 26 is in the midposition or is turned out of the mid-position in counterclockwise direction owing to preponderance of the attracting force of the magnet 25b.

The switch 48 being closed, the magnet 49 is excited, and the lever 50 is therefore against a stop 51 and at the joint 30 as in the position shown in the drawings. In this position of the system of rods 28—31 the piston valve 11 is in or below the closing position. The piston 10 of the servomotor remains therefore in the top position corresponding to the extreme position C ($n_{min.}$) of the contact lever 16.

If the controller 22 is then turned so that a part of the control resistance 21 is switched in, the voltage at the terminals of the fixed resistance 24 decreases. The attracting power of the magnet 25a is then preponderant and turns the lever 26 to the right, whereby the piston valve 11 is raised. Pressure medium thereby comes onto the upper side of the piston 10, which descends. The number of revolutions increases and the contact lever 16 is turned upwards, whereby also a part of the regulating resistance 17 is switched in.

This operation lasts until $$\frac{17+17a}{3a}=\frac{21+21a}{24}$$

at which moment the two magnets 25a and 25b develop again the same attracting force, whereby the lever 26 returns into the midposition and the piston valve 11 into the closing position. The number of revolutions then assumes a new value, which corresponds to the new position of the controller 22 or to the tapping of the control resistance 21. At the same time the regulating resistance 17 has been altered, so that the auxiliary generator 3 has the same voltage at the higher speed as at the previous speed.

In this manner the speed can be increased by steps to the maximum at B ($n_{max.}$) for the spring 9 and to D ($n_{max.}$) for the contact levers 16. When the controller 22 is turned back, the partial voltage on the fixed resistance 24 is greater than on the field coil 3a, whereby the magnet 25b becomes preponderant and turns the lever 26 to the left. The piston valve 11 consequently descends and the piston 10 ascends.

It is preferable to give the control resistance 21 the same number of tappings and similarly graduated tappings as the regulating resistance 17. The contact lever 16 thereby will always remain standing accurately on a tapping contact. In order that the contact finger may run completely onto the corresponding contact, it is sometimes advisable, to provide corresponding slots. In order to be able to do without these slots, it is also possible to mutually displace the tappings at the control resistance 21 and at the regulating resistance 17, for instance by specially adjusting the additional resistances 17a and 21a so that the lever 16 must always stop between two tapping points in order to bring the relays 25a and 25b to rest. The lever 16 then oscillates always to and fro, so that any damaging of the contacts owing to too high contact loading, when the corresponding contacts are only partly touched, is prevented.

If there is no voltage from the auxiliary generator 3, whilst the speed is at the same time high, the speed adjusting device will remain set according to this value, even if the controller 22 has been returned into the position I. Since the internal combustion engine is then not loaded, the speed may rise to values which under certain circumstances might be harmful to the engine 1. To prevent this, the pivot point 38 is moved downwards. As soon as the voltage of the auxiliary generator 3 disappears, the magnet 49 releases its armature and the spring 52 lifts the rod 50 from the stop 51. The rod 31 is thereby pulled downwards so far, quite independently of the position of the rod 28, that the piston valve 11 comes below the closing position, whereby pressure medium flows to the lower side of the piston 10 of the servomotor, lifts the same and thus reduces the speed to a minimum. For cutting-out the magnet 49 an emergency switch 48 may be provided, in order that the number of revolutions can be reduced to a minimum also when voltage exists in the auxiliary generator 3, the impulse transmitter 25 not being in operation.

The field coil 3a is liable to become heated. If the fixed resistance 24 does not heat to the same degree, a certain position of the controller 22 in the warm state of the auxiliary generator 3 will not correspond to the same speed as in the cold state. If therefore it is material that the speed at certain steps should be accurately preserved, it is advisable to construct the resistance 24 with the same temperature characteristic as the coil 3a, i. e. to make it for instance of copper or iron, care being taken that a sufficient heat capacity is produced by properly dimensioned heat insulation. The fixed resistance 24 may be made partly of a material with low temperature coefficient such as constantan, or partly of a material with high temperature coefficient such as iron. Thereby with the smallest possible volume the same alteration in resistance will be attained as a function of the time, as in the field winding 3a. On the other hand, the fixed resistance 24 may also be mounted, in the form of coils, on the poles of the auxiliary generator 3, some coils of similar size being connected or wound in opposite directions so that their total effect upon the field of the auxiliary generator 3 is always equal to zero.

With the impulse transmitter shown in Fig. 2 the two partial voltages for the fixed resistance 24 and the field coil 3a are transmitted to the two coils 53 and 54 of a crossed-coil instrument 55. According to whether the one or the other part voltage is preponderant, the moving system 56 is turned in the one or other direction and the piston valve 11 is moved upwards or downwards.

In Fig. 3 the lever 7 controls only the fuel pump 8. The piston valve 11 and shaft 14 are adjusted by means of a motor 57 which is controlled by an impulse transmitter 58, 59.

The operation is as follows: The winding 58 represents the fixed exciter coil of a polarized relay. It is connected to the auxiliary generator 3 and therefore uniformly excited, as the voltage of the latter is maintained constant. The rotary coil 59 is connected on the one side to the positive terminal 60 of the fixed resistance 24 and on the other side to the positive terminal 61 of the field coil 3a. The values of the resistances for the field circuit 18 and for the control circuit 19 are also tuned so that at the lowest speed of the internal combustion engine 1, i. e. with the controller 22, the contact lever 16, and the switch cylinder 15 in the position shown in the drawing, the voltage on the stationary resistance 24 is greater than on the field 3a. Current then flows from the terminal 60 to the terminal 61 through the rotary coil 59, which turns clockwise, so that the contact 62a is closed.

The circuit leading to the field coil 57a of the motor 57 is interrupted at the contact 64 on the drum 15. If the controller 22 is turned out of the position I, a portion of the control resistance 21 is put in series with the fixed resistance 24. The voltage at terminal 60 therefore decreases and a current flows from 61 to 60, so that the rotary coil 59 turns from the mid-position determined by the return springs 27, constructed as tension springs, in counterclockwise direction and closes the contact 62b. A current flows then through the contact 69 to the field coil 57b of the motor 57 which rotates the drum 15 in the direction of the arrow 46.

At the same time a spindle 66 is pulled upwards through the intermediary of shaft 14 with the aid of a gear 65. The piston 10 remaining stationary for the time being, the piston valve 11 is moved upwards by a lever 76 jointed at 68 on the spindle 66 and, in the position shown of the intermediate valve 67, allows pressure oil to flow to above the piston 10 until this piston has descended far enough that the piston valve 11 in the new position of the lever 76 has again been moved into the closing position. The spring 9 has been compressed thereby by a certain extent, and the speed of the internal combustion engine 1 has increased by a corresponding amount.

Turning the shaft 14 has as consequence also an alternation of the regulating resistance 17, and so much of the resistance 17 is switched in until the voltage at the terminal 61 has sunk to the same value as that at the terminal 60. The coil 59 is then again without current, and the contact lever 63 is moved by its return springs 27 into mid-position, the current supply to the motor 57 being interrupted at the same time. In this manner the drum 15 can be brought into the extreme position, by turning the controller 22 into position XIV (Fig. 3 at the top, to the right). In this position the current to the motor 57 is interrupted owing to the contact finger having run off the contact 69.

After a slight rotation of the drum 15 in the direction of the arrow 46, the contact 43 switches-in the exciter relay 45 in a similar manner as in Fig. 1. The relay 45 can be switched-in only in this position in order to prevent that the whole output of the internal combustion engine 1 is thrown onto the motors 4 already in the first operative position. The contact 45a of the relay 45 is a holding contact as in Fig. 1. The contact 45b effects, in the closed position of the relay 45, the current supply to the contact 69 and enables only in this manner a further rotation of the drum 15. If the relay is cut out for any reason, for instance by opening the switch 44, no current is supplied also to the motor 57 through the field coil 57b, the speed can then not be increased any more. On the other hand, the relay 45 when being released closes the circuit which leads through the contact 64 to the field coil 57a of the motor 57, whereby a rotating of the drum 15 in opposite direction to the arrow 46 in the sense of a decrease in the speed takes place.

If at normal working the controller 22 is turned back from one of the higher positions by one or several steps, the voltage at the terminal 60 is for a short time higher than at the terminal 61, so that a current flows through the coil 59 in the direction 60—61. The rotary coil 59 turns then in clockwise direction and the contact 62a is switched in. Current is therefore supplied to the field coil 57a of the motor 57 through the contact 64, and the drum 15 is rotated in the direction of the arrow 46, whereby on the one hand the contact lever 16 gradually short-circuits the regulating resistance 17 and the spindle 66 is pushed downwards by the gear 65, so that also the lever 16 pulls the piston valve 11 downwards. Consequently, the piston 10 moves upwards and releases the regulating spring 9.

In Fig. 3 a device for regulating the main generator field is indicated merely by the rectangle 70. Any of the known systems may be employed for this.

Certain fluctuations of the voltage of the auxiliary generator 3 do not influence the manner of operation of the regulating device, since the voltages between the terminal 60 or 61 and the negative pole alter in the same sense. The numbers of revolutions are therefore maintained with the same accuracy, whether the voltage remains accurately constant or not. Merely the accuracy with which the relay 58, 59 comes into operation will suffer somewhat from the voltage fluctuations. If the voltage of the auxiliary generator has to be maintained accurately constant, this can be done with the aid of any voltage regulator of known construction. If, however, the governor regulates the current in the field coil 3a, certain disturbances will occur in the regulation of the speed, in that the voltage at the terminals of the field coil 3a changes, without the control resistance 21 having been adjusted. The relay 58, 59 would therefore respond to an action of the voltage regulator and influence the speed. For these reasons it is advisable, to insert the voltage regulator 71, as indicated in the figure, in a separate field coil 3b, so that any influencing of the operation of the relay 58, 69 by the voltage regulator 71 is prevented.

For reducing the speed in case of lack of voltage in the auxiliary generator 3, the following device is provided:

The switch 48 being closed, the intermediate valve 67 is held by the magnet 72 in the position shown, until the auxiliary generator develops sufficient voltage. As soon as this is no longer the case, the coil of the magnet 72 liberates the armature, and the spring 73 pulls upward the intermediate valve 67 so that also in the top position of the piston valve 11 pressure medium may enter from below to the piston 10 and thereby bring the speed to a minimum. The shaft 14 is not brought into the position corresponding to the minimum speed, but this is however of no consideration. Also in this instance, as in Fig. 1, the switch 48 is provided for use in an emergency.

In Fig. 4 a separately excited motor 75 is provided instead of the series motor 57 shown in Fig. 3. The relay 58, 69 is then omitted. In its stead the field coils 74a and 74b are directly connected in parallel with the fixed resistance 24 or the field coil 3a. According to whether the field produced by the winding 74a or the winding 74b is preponderant, the shaft 14 turns in the sense of a decrease or increase of the speed. In the construction shown in Fig. 4, the other arrangements may be similar to those in the construction shown in Fig. 3. Instead of the double magnet 25a, 25b (Fig. 1) or of the crossed-coil instrument 55 (Fig. 2) a motor 75 may be employed as shown in Fig. 4; the armature of this motor adjusting the piston valve 11 as in Fig. 2, which valve is then returned into the mid-position by return motion springs when the field coils 74a and 74b balance each other.

In Fig. 5 the motor 57 drives the spring plate 9a direct through the intermediary of the gear 65 and the spindle 66. As loading for the internal combustion engine, instead of a generator 2 which supplies current to the driving motors 4 (Fig. 1), a set 85, for instance an hydraulic gear, is provided. The regulating resistance 17 or the control resistance 21 are in this instance arranged on the negative side of the field coil 3a or of the fixed resistance 24. When the controller 22 is turned in the sense of an increase of the speed, the switched-in portion of the control resistance 21 is increased as before. Since in this manner of operation, in contrast to Fig. 3, the voltage at the terminal 60 is higher than at 61, the current flows through the coil 59 in the direction 60—61. By suitable direction of winding, it is nevertheless arranged that now the contact 62b is switched in, so that through the contact 69 on the drum 15 the motor 57 is excited by the field coil 57b. The drum 15 then turns in the direction of the arrow 46, and the spindle 66 is pressed downwards through the intermediary of the bevel wheel gear 65, whereby the tension of the spring is increased and the number of revolutions increased also. The manner of operation is therefore the same as has been described with reference to the preceding figures.

Also in this instance a voltage regulator 71 may evidently be provided, such as shown in Fig. 3, or a motor 75 in the connections according to Fig. 4 instead of the motor 57.

In the form of construction shown in Fig. 5 the decreasing of the number of revolutions to the minimum when the voltage of the auxiliary generator 3 disappears is not to be attained with simple means. Instead of such a device, an arrangement for stopping the internal combustion engine 1 in case of lack of voltage is provided. The operation of this arrangement is as follows:

By means of a magnet 77 which receives current from the auxiliary generator 3, a stop 79 is drawn away from a stop 80 on the regulating rod 81 of the fuel pump, at the same time compressing the spring 78, so that the system of rods 82 connecting the governor 5 with the fuel pumps 8 can freely adjust the rod 81. If the voltage of the auxiliary generator 3 disappears, the armature of the magnet 77 is liberated. The stop 79 then presses against the stop 80 and the fuel pumps 8 are adjusted to the 0-filling. By inserting the spring element 83 between the rod system 82 and the regulating rod 81 the resistance against moving of the regulator rod 81 of the fuel pumps is reduced.

Also in this instance an emergency switch 48 may be connected up in the circuit of the cutting-out magnet 77, and further a relay 84 which drops if the source of control current to the motor 57 should fail.

I claim:

1. Power generating apparatus including an internal combustion engine, which drives a generator operated with voltage maintained at least approximately constant and which can be operated at different speeds by means of an adjustable device for altering the number of revolutions, characterised in that parallel to a field circuit of the generator with a resistance serving to maintain the voltage constant, a control circuit is provided which has several tappings, an impulse transmitter responding to the alterations in voltage and influencing the adjusting of the number of revolutions being inserted so that a voltage difference which has occurred in consequence of the tapping of the control resistance effects the intended alteration of the number of revolutions.

2. Apparatus as claimed in claim 1, characterised in that the impulse transmitter comprises two electro-magnets, one of which is excited by a partial voltage in the field circuit, and the other one by a partial voltage in the control circuit, and the armature system of these electro-magnets influences the speed adjusting device, when the influence of the partial voltage in the field circuit is preponderant, in the sense of a decrease in the number of revolutions and, when the influence of the partial voltage in the control circuit is preponderant, in the sense of an increase in the number of revolutions or inversely.

3. Apparatus as claimed in claim 1, characterised in that the impulse transmitter is constructed as an apparatus based on the principle of electric crossed-coil measuring instruments and the one coil is excited by a partial voltage in the field circuit, the other coil by a partial voltage in the control circuit, and the coil system influences the speed adjusting device, when the influence of the partial voltage in the field circuit is preponderant, in the sense of a decrease in the number of revolutions and in the sense of an increase in the number of revolutions, when the influence of the partial voltage in the control circuit is preponderant, or inversely.

4. Apparatus as claimed in claim 1, characterised in that the impulse transmitter is constructed as polarised relay, the rotary coil of which is inserted between the field circuit and the control circuit and the direction of current in the same is altered according to whether the tapping of the control resistance is altered to obtain an increase or decrease in the number of revolutions.

5. Apparatus as claimed in claim 1, whose speed adjusting device is constructed as an hydraulic servomotor, characterised in that the piston of the servomotor actuates the movable element of the regulating resistance.

6. Apparatus as claimed in claim 1, with an hydraulic servomotor serving for adjusting the number of revolutions, characterized in that an electric motor, with field coils for rotating clockwise or counterclockwise and controlled by the impulse transmitter, is provided which controls the movable part of the regulating resistance and also the control valve of the servomotor through a reverse motion lever connected to the servomotor piston.

7. Apparatus as claimed in claim 1, characterised in that separated from the field circuit influencing the impulse transmitter another field circuit is provided on the generator in which a voltage regulator of known type is built for maintaining the voltage of the generator constant.

8. Apparatus as claimed in claim 1, characterised in that the temperature characteristics of the fixed resistance, located in the control circuit and influencing the impulse transmitter, are adapted to those of the generator field winding influencing the impulse transmitter.

9. Apparatus as claimed in claim 1, characterised in that the fixed resistance is made partly of a material with low temperature coefficient such as constantan, partly of a material with high temperature coefficient such as iron in order to attain with the smallest possible volume the same alteration in resistance as a function of the time, as in the field winding.

10. Apparatus as claimed in claim 1, characterised in that the fixed resistance is made of the same material as the generator field winding, that it is specifically similarly loaded and arranged on the poles of the generator so that on the one hand it does not influence the field and on the other hand its heating conditions are similar to those of the field winding.

11. Apparatus as claimed in claim 1, characterised in that a safety device, operating in accordance with the voltage of the generator, influences the admission of power medium to the servomotor for the speed adjusting device in such a manner that, when voltage is lacking, the device is set to the smallest number of revolutions.

12. Apparatus as claimed in claim 1, characterised by a safety device which operates in accordance with the voltage of the generator and which partly or completely shuts off the power medium supply to the internal combustion engine when the generator voltage fails.

13. Power generating apparatus which comprises an engine, a main generator driven by the engine, an auxiliary generator driven by the engine, a field excitation for the main generator having a variable field resistance, said field excitation being connected to the output terminal of the auxiliary generator, a field excitation for the auxiliary generator, a field circuit in series with the field excitation for the auxiliary generator, a variable regulating resistance in the field circuit, a control circuit connected in parallel to the field circuit, a variable control resistance in the control circuit, an impulse transmitter inserted between the field circuit and the control circuit, a speed regulating device for the engine operatively connected to the impulse transmitter, and means operatively connecting the speed regulating device with the variable resistance of the field excitation of the main generator, said impulse transmitter being constructed and arranged whereby variations in the voltage of either or both the field circuit or the control circuit due to variations in the resistance of the regulating resistance or the control resistance will actuate the speed regulating device to control the speed of the engine.

14. Apparatus according to claim 13 which comprises switch means operatively connected to the speed regulating device, a relay arranged to open or close a circuit connecting the auxiliary generator to the field excitation of the main generator and to open and close a circuit connecting the field circuit with the control circuit, said relay being connected to and operated by the said switch means.

15. Apparatus according to claim 13 in which the impulse transmitter comprises one electromagnet connected to and operated by partial voltage in the control circuit and another electromagnet connected to and operated by partial voltage in the field circuit.

16. Apparatus according to claim 13 which comprises switch means operatively connected to the speed regulating device, a relay operating switch means in the excitation circuit of the main generator, the field circuit and the control circuit, said relay being in circuit with the first mentioned switch means, and means connecting the first mentioned switch means with the regulating resistance, whereby the operation of the switch means and the regulating resistance may be in unison.

17. Power generating apparatus which comprises an engine, a main generator driven by the engine, field excitation for the main generator, an auxiliary generator, field excitation for the auxiliary generator, a control circuit, a variable control resistance in the control circuit, a field circuit connected in parallel to the control circuit, a variable regulating resistance in the field circuit, an impulse transmitter operatively connected to the control circuit and to the field circuit, a control motor, a switch operated by the control motor, said impulse regulator being constructed and arranged to operate the control motor by means of its field excitation as a result of differences in voltage in the field circuit and the control circuit to which the impulse regulator is connected, a speed regulating device for the engine operatively connected to the control motor, a relay operated by the switch, said relay being constructed to open and close circuits connecting the field excitation of the main generator with the control and field circuits and a circuit connecting the field of the control motor, whereby variations in the resistance of the control resistance varying the voltage of the control circuit causes the speed regulating device to change the speed of the engine.

18. Apparatus according to claim 17 in which the switch is a drum switch rotated by the control motor and the regulating resistance is varied simultaneously with rotation of the drum switch.

19. Apparatus according to claim 17 in which the impulse transmitter comprises a rotary coil arranged to operate two separate switches.

20. Power generating apparatus which comprises an engine, a main generator, an auxiliary generator having field excitation means, said generators being driven by the engine, a speed regulating device for the engine, a control motor having field excitation means arranged to operate the speed regulating device, a control circuit, a variable control resistance in the control circuit, a field circuit, a variable regulating resistance in the field circuit, said circuits being connected in parallel, said circuits being connected to the output terminals and to the field excitation of the auxiliary generator, an impulse regulator connected to the said circuits, a switch operated by the control motor, said impulse regulator and said switch being arranged to control the field excitation of the control motor, whereby variations in the voltage of the said circuits will be transmitted to the control motor and effect variations in the speed of the engine.

OSCAR SCHLÄPFER.